June 18, 1968 D. C. KIPFER 3,388,484
DYNAMIC ORBITAL TRAINER
Filed Sept. 10, 1964 3 Sheets-Sheet 1
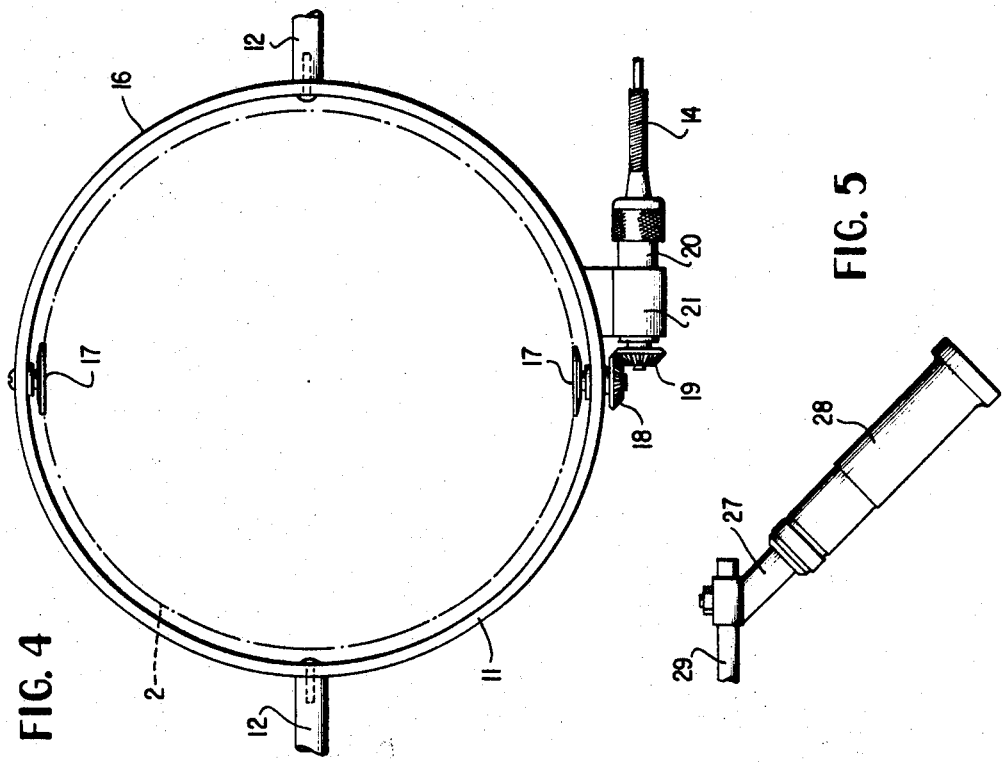
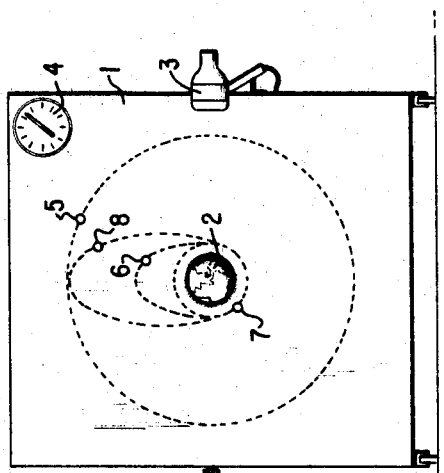
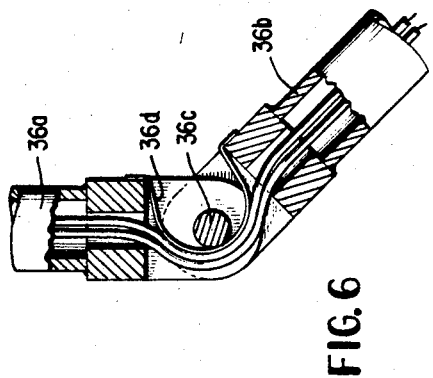
INVENTOR.
DONALD C. KIPFER
BY Dicke + Craig
ATTORNEYS.

June 18, 1968 D. C. KIPFER 3,388,484
DYNAMIC ORBITAL TRAINER
Filed Sept. 10, 1964 3 Sheets-Sheet 2
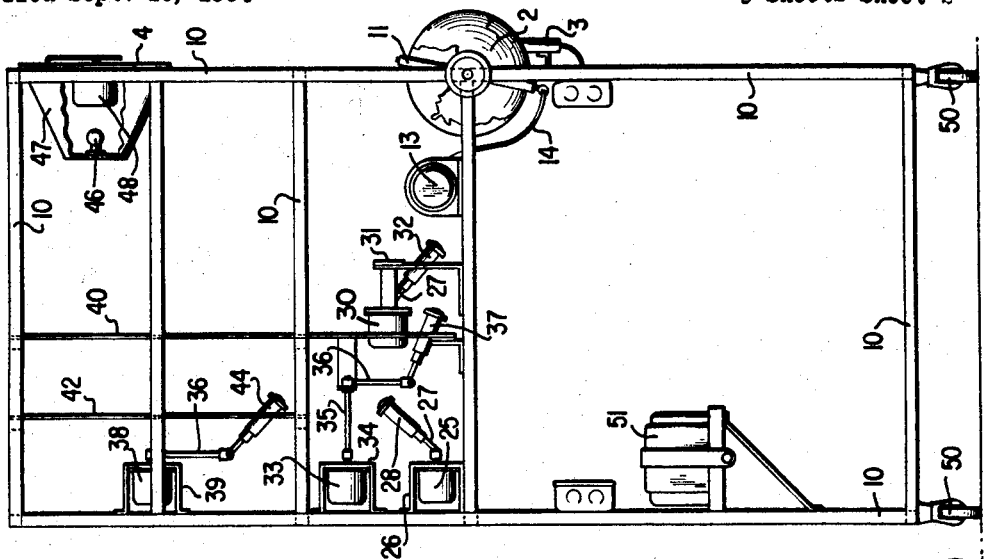
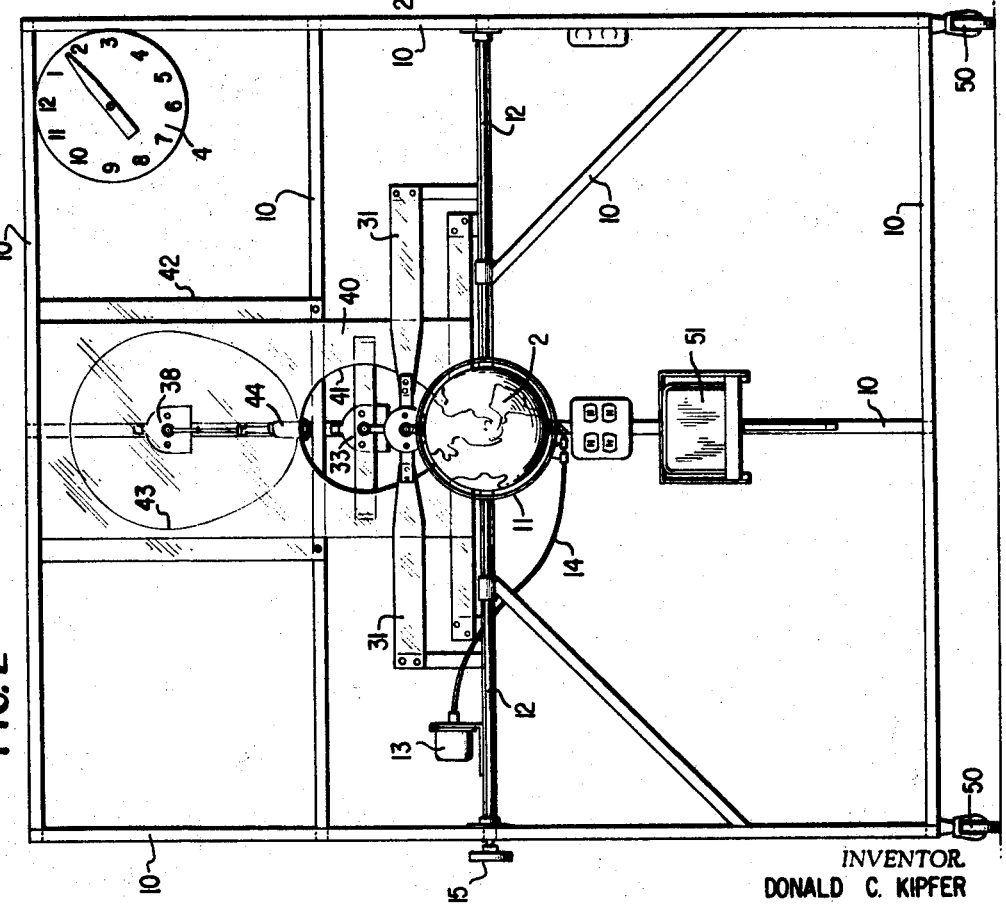
INVENTOR.
DONALD C. KIPFER
BY Dicke & Craig
ATTORNEYS.

June 18, 1968   D. C. KIPFER   3,388,484
DYNAMIC ORBITAL TRAINER

Filed Sept. 10, 1964   3 Sheets-Sheet 3

INVENTOR.
DONALD C. KIPFER
BY
Dicke & Craig
ATTORNEYS.

United States Patent Office 3,388,484
Patented June 18, 1968

3,388,484
DYNAMIC ORBITAL TRAINER
Donald C. Kipfer, 3449 S. Court St.,
Montgomery, Ala. 36105
Filed Sept. 10, 1964, Ser. No. 395,499
6 Claims. (Cl. 35—47)

The present invention relates in general to educational aids, and more particularly, to a device for providing a visual representation and demonstration of orbital space operations, including a three-dimensional representation of satellite orbits and their relationship to the surface of the earth.

Due to the extremely rapid advance in space technology evidenced in recent years, a great need for trained personnel in support of research and development in these areas has manifested itself. In addition, since this field of endeavor has experienced a rather recent advent, even the most basic and rudimentary fundamentals of this science must be specially taught to provide the potential worker in the art with the basic tools. However, certain relationships, such as satellite orbital operations, although describable in terms of mathematical formula, are best understood through visual representation of the various principles involved.

In providing a training device for exhibiting orbital space operations in a visual manner, it is of primary importance that the visual indication provided by the device be as realistic as possible and include as many basic principles of operation as needed to provide a clear understanding of the various considerations involved, while avoiding, as much as possible, an over complication of the device to the point where its size or cost prohibits extensive and frequent use.

It is therefore a primary object of the instant invention to provide a three-dimensional trainer for visual demonstration of orbital space operations.

It is another object of the instant invention to provide an orbital trainer which will permit the demonstration of a near-earth circular orbit, elliptical orbits with different eccentricities, and circular orbits at synchronous altitude.

It is a further object of the instant invention to provide an orbital trainer in which the represented satellites will move at their proper relative velocity, dependent upon the altitude and eccentricity of their orbits. In preserving relative velocity, the circular orbital satellites represented by the device will move slower as the radius of their orbits increase. Also elliptical satellites will move faster near perigee and slower near apogee.

It is still another object of the instant invention to provide an orbital trainer capable of demonstrating an intercept by Hohmann transfer ellipse from a near-earth parking orbit to a synchronous circular orbit.

It is another feature of the instant invention to provide an orbital trainer which preserves a proper representation of day and night over the surface of the earth, and also provides a correlation between real and trainer time.

It is another feature of the instant invention to provide an orbital trainer in which an indication may be obtained of the satellites earth trace showing the westward regression of successive earth traces from satellites in inclined orbits and the sinusoidal type trace which is characteristic of an inclined orbit's earth track.

It is still another feature of the instant invention to provide an orbital trainer which is freely portable and sufficiently uncomplicated to permit its use extensively as a training aid for the study of orbital space operations.

These and further objects, features and advantages of the present invention will become more obvious from the following description when taken in connection with the accompanying drawing which shows, for purposes of illustration only, one embodiment in accordance with the present invention, and wherein:

FIGURE 1 is a front elevational view of the displayed device in accordance with the instant invention;

FIGURE 2 is a front view of the device of FIGURE 1 with the display panel removed so that the inner working elements of the device are exposed;

FIGURE 3 is a side view of the device illustrated in FIGURE 2 having the side casing removed so as to expose the inner workings of the device;

FIGURE 4 is a detailed view of the gimbal for the display globe along with an illustration of the drive device for said globe;

FIGURE 5 is a detail of one type of support arm for one indicating means providing a satellite indication on the display panel;

FIGURE 6 is a detail view of the pivotal connection in the support arm for another indicating device providing a visual representation of an elliptical satellite orbit on the display panel;

Figure 7:
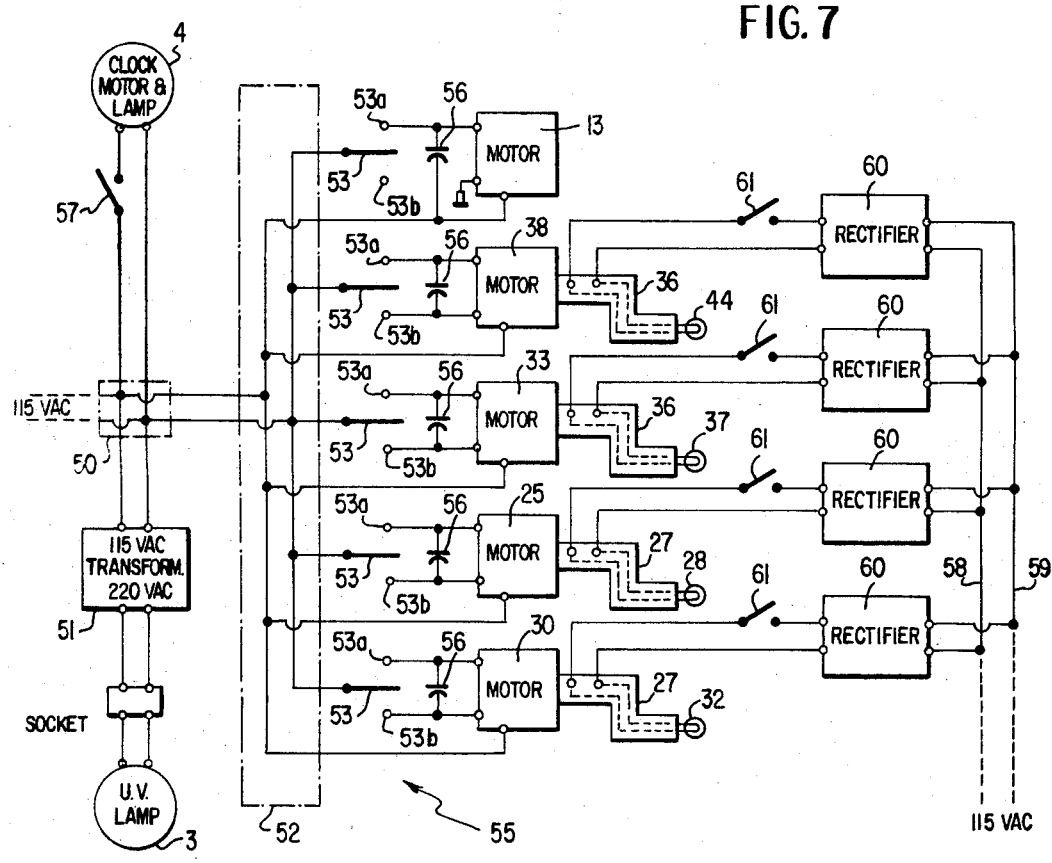
FIGURE 7 is a schematic block diagram of the control circuit utilized in conjunction with the instant invention.

Referring now to the drawing wherein like reference numerals are used throughout the several views to designate corresponding parts wherever possible and more particularly to FIGURE 1, reference numeral 1 designates a rectangular display panel or screen oriented in a generally vertical position for ease of viewing and positioned relatively close to the floor so as to permit the operator or instructor to approach the screen during the demonstration to emphasize certain features of the display. The display panel 1 is preferably provided in the form of a Plexiglas sheet backed with a long persistent fluorescent material capable of providing a sharp spot of light and providing a trace upon being radiated by a pencil beam of light from behind the display screen. The Plexiglas sheet is essentially transparent to permit the visual indication from the fluorescent material to be seen from in front of the panel or screen.

An aperture is provided substantially in the center of the display screen 1 for accommodating a three-dimensional sphere 2 representing the earth. The sphere 2 is provided with representations of the continents and oceans of the world painted on an opaque sphere. The continents on the sphere are pointed with phosphorescent paint so that these surfaces will glow when subjected to ultraviolet illumination and stand out from the oceans, which are preferably painted with a blue enamel. While it is indicated that the globe is opaque, it is understood that this is merely a matter of choice since the globe could be provided as a transparent plastic sphere with the continents and oceans painted thereon without loss of advantage.

A source 3 of ultraviolet light is provided at one vertical edge of the panel 1 in line with the globe 2 in the relative position of earth and sun and serves to illuminate the globe over portions thereof so as to provide a representation of day and night over the surface thereof. The ultraviolet light is provided as a restricted beam which illuminates the phosphorescent paint of the globe providing a glow over substantially half of the earth's surface such as provided by the sun.

In one corner of the panel 1 there is provided an accelerated clock 4 driven separately from the globe 2 which maintains a correlation between trainer time and real time. The speed of rotation of the clock is coordinated to the rotation of the globe so as to indicate earth time at a reference location on the rotating globe.

Looking now to FIGURES 2 and 3, a metal framework 10 is provided for support of the display panel or screen 1, and the operating mechanism, rotating globe and control circuits, which provide the visual representations displayed in accordance with the present invention. The framework 10 is illustrated as consisting of a plurality of longitudinally and transversely disposed beam members in the form of a generally rectangular box-like rack; however, it should be quite apparent that any means of support which will accommodate the rotating globe and maintain the display panel in proper position for viewing, and which will accommodate the operating mechanism in the proper manner will satisfy the requirements of the invention.

The various structural members of the framework 10 may be joined in any conventional manner, such as bolting, welding, or the like. Outside of the specific support elements associated with particular items of the operating mechanism of the traininer, the number and position of the structural elements of the framework are governed only by considerations of strength and rigidity in support of the operating mechanism.

The globe 2 is supported for rotation about its polar axis within a gimbal 11, which in turn is supported by a pair of rotatable positioning rods 12 mounted on the frame 10 of the trainer. The rods 12 are free to rotate within their support couplings, and one positioning rod is provided at the end thereof with an operating knob or handle 15 by which the globe 2 may be rotated so that satellite orbits having inclinations between equatorial and polar may be demonstrated. The knob or handle 15 may be equipped with any suitable locking means or tightening means of conventional form to maintain the globe in a given rotated position so as to prevent undesirable shifting thereof.

The globe 2 is rotated about its polar axis within the gimbal 11 by a motor 13 operably connected to the globe via flexible drive shaft 14 and a suitable drive connection between the drive shaft and the globe. The motor 13 drives the globe continuously for all positions of inclination thereof at a constant rate of one revolution each two minutes. This rate is sufficiently slow to properly assimilate all of the various visual relationships presented and sufficiently fast to adequately illustrate relationship based upon consecutively occurring events.

The gimbal 11 and drive connection associated therewith for rotation of the globe 2 are shown in detail in FIGURE 4. The gimbal ring 11 is fastened to the positioning rods 12 by any suitable means, such as screws or rivets, so as to provide a secure connection between the ring and the positioning rods. The globe is supported concentrically within the ring 11 by a pair of rotatable support members 17, one of which extends through the ring 11 and has connected thereto a bevel gear 18. Cooperating with the bevel gear 18 is a similar bevel gear 19 fastened by means of a conventional connector 20 to the terminal end of the flexible driving cable 14. The connector 20 is in turn fastened to the gimbal ring 11 by means of a bracket 21 so that rotation of the ring 11 may be accomplished without disconnecting the globe from the driving means.

Looking again to FIGURES 2 and 3, a first synchonous motor 25 mounted on bracket 26 to frame 10 has connected to its drive shaft a supporting arm 27 for a lamp 28, which lamp provides a pencil beam of light directed to the rear of panel 1. The lamp supporting arm 27, shown in detail in FIGURE 5, provides a rigid connection between the lamp 28 and the motor drive shaft 29 at a fixed prescribed angle and the motor 25 is mounted closely adjacent to an axis of the globe substantially perpendicular to the viewing screen so that the rotation of lamp 28 results in the representation of an orbiting satellite 5 (FIGURE 1) in a synchronous circular orbit, whose orbital radius is determined by the fixed angle between the lamp support arm 27 and the motor drive shaft 29.

The lamp 28 is preferably driven by motor 25 at a speed sufficient to provide satellite 5 with a period of approximately two minutes so that when globe 2 is positioned to provide a polar view of the earth satellite 5 will rotate with the globe poised over a fixed spot on the equator of the earth. In this way a synchronous orbit is quite clearly demonstrated. The particular orbital radius selected is a matter of choice; however, the rate of rotation of the lamp 28 must coincide with the rate of rotation of the globe to demonstrate a synchronous orbit.

A second motor 30 is supported by a pair of transparent support arms 31 which extend outwardly on either side of the motor 30 where they are secured to a suitable cross member on frame 10. The support arms 31 are transparent so as not to interfere with other projected light beams within the display apparatus. Connected to the drive shaft of the motor 30 is a connecting arm 27 and lamp 32, essentially identical to the support arm and lamp provided in association with the motor 25, as illustrated in FIGURE 5. However, due to the change in position of the motor 30 as compared to the motor 25 and the change in angle between the support arm and the motor drive shaft, a circular orbit having a smaller radius will be produced by the lamp 52 as compared to lamp 28. The representation produced on the display panel by the rotating lamp 32 is a satellite 7 (FIGURE 1) traveling in a near-earth circular orbit. The lamp 32 is preferably driven by motor 30 at a speed sufficient to provide satellite 7 with a period of approximately ten seconds; however, this obviously is a matter of choice as is the angle between lamp support arm 27 and motor drive shaft 29. In fact, means could be provided for selectively altering this angle to accommodate changes in lesson plan without the exercise of invention utilizing conventional parts.

A third motor 33 supported on the frame 10 by bracket 34 is provided with a drive shaft extension 35 supported on a bracket secured to a template 40. The extension 35 is secured to a lamp support arm 36 supporting lamp 37 for rotation of the lamp 37 by the motor 33 in a prescribed pattern. The prescribed pattern of rotation of the lamp 37 is determined by the template 40 which contains a properly dimensioned aperture forming a cam surface 41 within which the lamp 37 rides to produce the indication of an ellptical orbit formed by the track of satellite 6 (FIGURE 1). The template 40 is made of a transparent plastic so as not to interfere with other rotating beams of light within the mechanism.

Due to the positioning of the motor 33 at one focus of the ellipse formed by cam surface 41, the velocity of the spot of light traced upon the display screen by satellite 6 will increase in magnitude as it approaches perigee and decreases in value as it approaches apogee. In this way, a very realistic representation of satllite characteristics is produced by the display device in an extremely simple manner.

The lamp supporting arm 36 must necessarily maintain the lamp 37 in contact with the cam surface 31 of the template 40 if a proper elliptical orbit is to be produced on the screen 1. In order to insure the proper biasing of the lamp 37 against the cam surface 41, the supporting arm 36 is provided with a spring loaded articulation illustrated in detail in FIGURE 6. The articulation or spring biased connection is formed by separate portions 36a and 36b of the support arm 36 pivotally secured by a pivot pin 36c and biased by a U-shaped spring 36d positioned about the pin 36c and having its leg portions in contact with the connecting portions of the articulation 36a and 36b. By properly dimensioning the U-shaped spring 36d, sufficient spring force will be exerted upon the articulation to maintain the lamp 37 against the cam surface 41 without producing sufficient friction to affect the speed of rotation of the lamp 37.

As preferred by the invention, the track of satellite 6 on the display screen 1 (FIGURE 1) exhibits an eccentricity of four tenths and the lamp 37 is rotated at a speed sufficient to provide the rotating satellite 6 with a period of approximately twenty-seconds. However, these parameters are suggested only by way of example, and may be altered without exercise of invention either by varying the speed of motor 33 or replacing the template 40 by a template having a cam surface which will produce a different elliptical path or both.

A fourth motor 38 is supported by bracket 39 on the framework 10 and has connected to its drive shaft a lamp support arm 36 and lamp 44 essentially identical to that provided in association with the motor 33. The lamp 37 is guided in its path of rotation by a template 42 having a cam surface 43 for guiding the lamp 37 so as to produce an elliptical orbit by means of the satellite 8 (FIGURE 1).

The orbit produced by satellite 8 has a predetermined eccentricity so that it intercepts both the near-earth orbit produced by satellite 7 and the synchronous orbit produced by satellite 5. Thus, by prepositioning the satellites an intercept of the synchronous satellite 5 from a position in the near-earth parking orbit can be demonstrated. As in the case of satellite 6, the motor 38 is positioned at one focus of the ellipse formed by the cam surface 43 so that the relative velocity is preserved at apogee and perigee. By way of example in line with previously mentioned parameters, the speed of motor 38 may be set to provide a period of rotation of sixty seconds.

The clock 4 provided in one corner of panel 1 is run by a synchronous motor 48 which accelerates the clock so as to indicate a time commensurate with the rotation of the globe 2. The clock 4 is provided with a light source 46 positioned in a casing 47 surrounding the rear of the clock so that the entire face of the clock 4 is illuminated during operation of the trainer.

In order to make the trainer as convenient for use as possible, the framework 10 is mounted upon suitable rollers 50 which makes possible the simple transportation of the device from one area to another and also facilitates accurate positioning of the display device within the view of all interested spectators and students.

Figure 8:
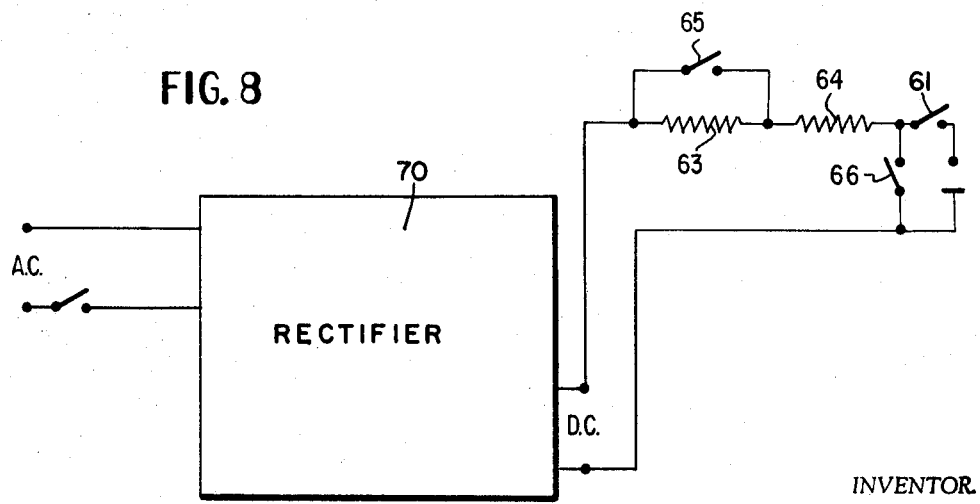
FIGURE 8 is a schematic circuit diagram of the rectifier devices utilized with the control circuit of FIGURE 7.

The control circuit for the display device of the instant invention illustrated in FIGURES 7 and 8 may be operated either from a panel mounted directly upon the framework 10 or may be operated remotely, if such would facilitate the presentation of the lesson. Looking specifically to FIGURE 7, a source of alternating current voltage is applied to terminal board 50 for distribution to the clock 4, ultraviolet light source 3 and motor control circuit 55. The normal 115 volt A.C. source is applied via switch 57 to the parallel combination of the clock motor 45 and lamp 46 in the clock mechanism 4 and is applied to the ultraviolet lamp 3 via a transformer 51 which increases the voltage from 115 volts to 220 volts for energizing the lamp 3.

The voltage source is also applied to a terminal board 52 wherein one side of the line is connected directly to the motors 30, 25, 33, 38 and 13 and the other side of the line is connected via a single pole double throw switch 53 to the respective motors. The switches 53 determine the direction of motor rotation dependent upon whether the switch is thrown toward contact 53a or contact 53b. Capacitors 56 are provided for each switch 53 to prevent arcing of the contacts during switching. All of the motors, except for the motor 13, are connected for rotation in either direction; the motor 13 is connected for uni-directional rotation, since it is used to drive the globe 2 representing the earth.

A separate source of alternating voltage is provided for energizing the neon lamps 32, 28, 37 and 44. This voltage source is applied via lines 58 and 59 to individual rectifier circuits 60, which convert the alternating voltage to direct current voltage of a sufficient level for operating the neon lamps. The rectifiers 60 are connected to the neon lamps through lamp support arms 27 or 36 via control switches 61 which make possible selective actuation or de-actuation of the various lamps.

A detail of the rectifier circuits 60 is shown in FIGURE 8. The D.C. voltage provided by the rectifier circuit is controlled by resistances 63 and 64 in series; however, a shorting switch 65 is provided for the resistance 63 and is utilized to affect a momentary increase in the voltage so as to provide an increase in the light output for each individual neon light. This is useful during the lesson to provide an increased brilliance for one of the satellite indications, especially during demonstration of Hohmann transfer, so as to direct attention to this satellite. Individual lamp starter switches 66 are also provided for the neon lamps so that the lights may be activated individually in a prescribed sequence during certain lessons. The rectifier arrangement itself which produces the change from A.C. voltage to D.C. voltage consists of a full wave recifier 70 and arranged in a substantially conventional manner to provide the full wave rectification of the applied alternating voltage.

In operation of the device, the ultraviolet lamp, the clock and the globe are energized via the appropriate control switches and the motors for rotating lamps are energized so as to produce a preferred direction of rotation in accordance with the particular lesson plan. The individual lamps are then actuated via the starter switches 66. The lamps may be actuated all at once or in sequence during the course of the lesson, and as already mentioned, the various orbits may be changed whenever desired to provide a different program of instruction.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A training device for providing visual representation of orbital satellite techniques comprising:
   a screen responsive to illumination for providing visible indications,
   a sphere carrying the representations of the earth's geography mounted for rotation within the plane of said screen,
   at least one lamp directed toward said screen for projecting a spot of light simulating a satellite thereon,
   motor means drivingly connected by means of a pivoted connection to said lamp for driving said lamp at a substantially constant angular speed of rotation about an axis directed substantially through said sphere, and
   control means for guiding said lamp along a path to produce movement of said spot of light on said screen in a closed elliptical pattern at a continuously varying velocity about said sphere, said control means consisting solely of a template having a guide and means for causing said lamp to follow said guide for determining the path of movement of said lamp rotated by said motor means, which guide presents an elliptical pattern in the plane perpendicular to said axis of rotation which passes through one focus of said pattern, said lamp pivoting on said motor means during rotation along said path.

2. A training device as defined in claim 1 wherein said template is provided with an aperture, the sides of which serve as the guide for said lamp, which extends through said aperture and is continuously biased in contact with the sides thereof.

3. A training device as defined in claim 1 wherein said sphere is mounted substantially at the center of said screen with the plane of said screen passing through the center of said sphere, and further including mounting means for said sphere including gimbal means for effecting adjustment of the orientation of the axis of rotation of said sphere.

4. A training device as defined in claim 1 further including illumination control means connected to said lamp for selectively varying the brilliance of said spot of light.

5. A training device as defined in claim 1 further including illumination means for illuminating a portion of said sphere so as to provide a continuous representation of day and night thereon.

6. A training device as defined in claim 1 including at least one additional lamp and a motor connected thereto for driving said lamp along a circular path to project a circular pattern of light about said sphere.

References Cited

UNITED STATES PATENTS

| | | | |
|---|---|---|---|
| 749,508 | 1/1904 | Wesson | 35—45 |
| 1,829,829 | 11/1931 | Goodwin | 35—45 |
| 2,949,682 | 8/1960 | Humbert | 35—46 |
| 3,003,257 | 10/1961 | Madden | 35—43 |
| 3,005,270 | 10/1961 | Musser | 35—45 |

FOREIGN PATENTS 158,451  1/1964  U.S.S.R.

JEROME SCHNALL, *Primary Examiner.*